United States Patent [19]

Knop et al.

[11] Patent Number: 4,564,859
[45] Date of Patent: Jan. 14, 1986

[54] METHOD AND AN APPARATUS FOR PRODUCING COLOR SEPARATIONS FOR SINGLE COLOR PRINTING

[75] Inventors: Hans-Georg Knop, Heikendorf; Michael Nowak, Kiel; Friedrich Redecker, Heikendorf; Ralf Tiede, Klausdorf, all of Fed. Rep. of Germany

[73] Assignee: Dr. Ing. Rudolf Hell GmbH, Fed. Rep. of Germany

[21] Appl. No.: 543,521

[22] Filed: Oct. 19, 1983

[30] Foreign Application Priority Data

Oct. 22, 1982 [EP] European Pat. Off. ....... 82 109759.9
Dec. 24, 1982 [EP] European Pat. Off. ....... 82 112002.9

[51] Int. Cl.$^4$ .......................... H04N 1/46; G03F 3/08
[52] U.S. Cl. .......................... 358/75; 358/80
[58] Field of Search .............................. 358/75, 78, 80

[56] References Cited

U.S. PATENT DOCUMENTS

| 2,993,087 | 7/1961 | Hell | 358/80 |
| 4,075,662 | 2/1978 | Gall | 358/280 |
| 4,075,663 | 2/1978 | Wellendorf | 358/283 |
| 4,110,826 | 8/1978 | Möllgaard et al. | 364/526 |
| 4,194,839 | 3/1980 | Knop | 356/407 |
| 4,261,011 | 4/1981 | Knop | 358/75 |
| 4,285,009 | 8/1981 | Klopsch | 358/76 |
| 4,414,635 | 11/1983 | Gast et al. | 358/75 |
| 4,500,972 | 2/1985 | Kuhn et al. | 358/11 |

FOREIGN PATENT DOCUMENTS 2923472 12/1980 Fed. Rep. of Germany .
2923468 1/1981 Fed. Rep. of Germany .
2923477 1/1981 Fed. Rep. of Germany .

Primary Examiner—James J. Groody
Assistant Examiner—Randall S. Svihla
Attorney, Agent, or Firm—Hill, Van Santen, Steadman & Simpson

[57] ABSTRACT

A method and apparatus for producing color separations for single color printing in electronic reproduction, for example in textile, decorative, or packaging printing. A colored master is optoelectronically scanned point-by-point and line-by-line to obtain color signals. Color recognition signals which identify the different colors of the master during scanning are produced from the color signals. Further corrected color separation signals are obtained from the color signals. The corrected color separation signals are controlled by selected color recognition signals representing selected colors of the master. The color separation signals are switched on by the color recognition signals when the corresponding colors in the master are identified, and are switched off when the colors are not present. At least two switched on color separation signals form a recording signal which controls the recording of the color separations for the different colors of the master. As a result, the color graduation or the graduated color distribution at the boundaries of the color areas in the color separations are improved such that the boundaries overlap. Due to the overlapping color areas, zones of mixed printing arise in the color separations. Disturbing color interruptions in the color separations are thus avoided.

13 Claims, 1 Drawing Figure

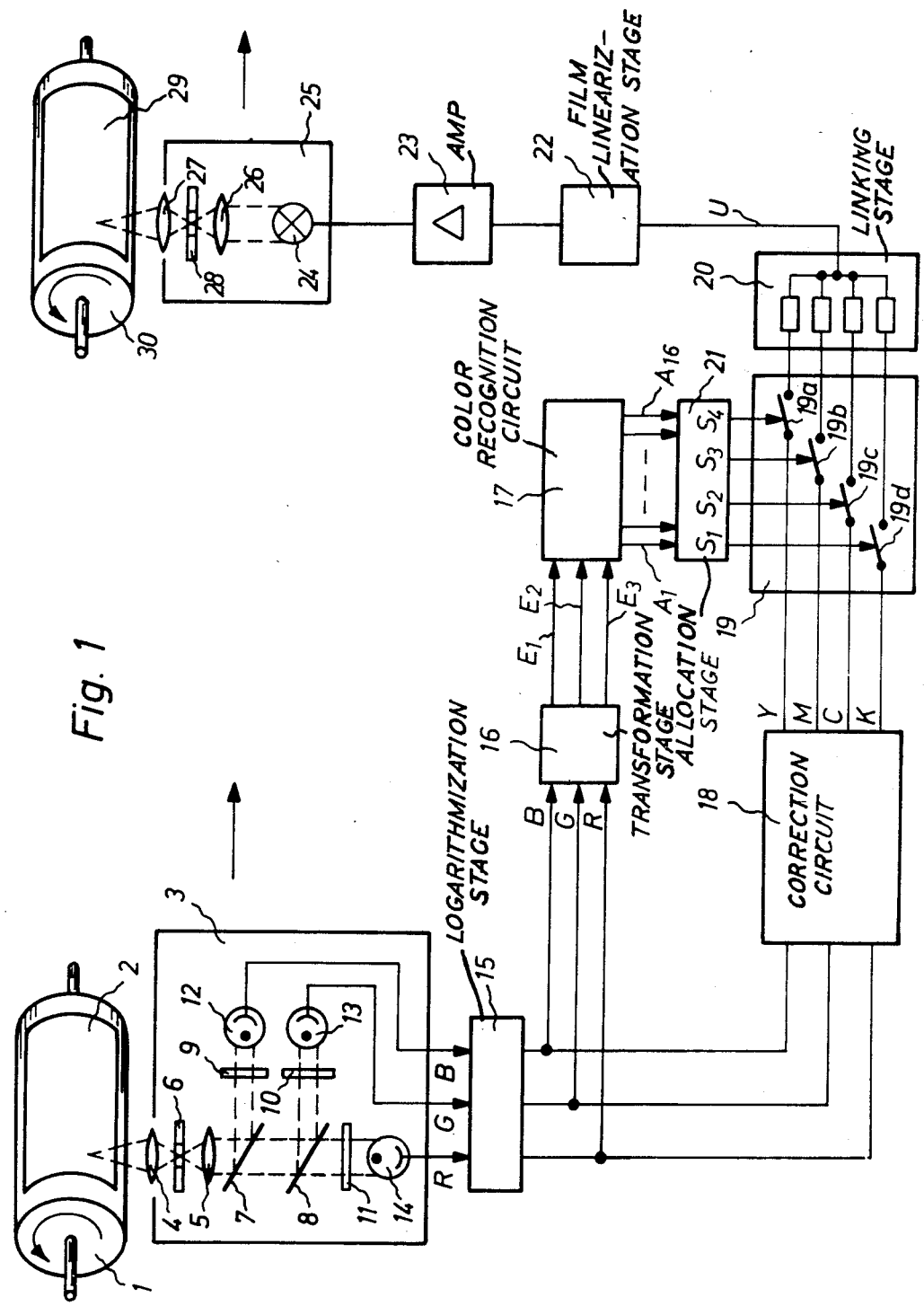

METHOD AND AN APPARATUS FOR PRODUCING COLOR SEPARATIONS FOR SINGLE COLOR PRINTING

BACKGROUND OF THE INVENTION

The invention relates to the field of electronic reproduction technology for single-color printing, and particularly relates to a method and an apparatus for producing color separations. What is meant by single-color printing is, for example, textile printing, decorative printing, or packaging printing.

The color application to the print medium in multicolor mixed printing occurs by means of superimposed printing of different proportions of the printing inks "yellow", "magenta", "cyan" and "black". However in single-color printing, each color to be printed is blended before the printing process and is then separately transferred to the print medium so that a corresponding color separation must be produced for every color of the pattern master.

Such a pattern master exhibits, for example, color tones with a graduated color distribution, i.e. with a differing color saturation and/or luminosity within the individual color tones. In this case, the color separations must indicate the topical distribution of the individual colors as well as indicate the shading (continuous tone) or graduated color distribution, i.e. the locally different strength of the color application.

An installation for producing color separations for single-color printing is already known from U.S. Pat. No. 4,261,011, incorporated herein by reference. Three primary measured color signals which represent the color components red, green, and blue of the scanned image points are obtained by means of point-wise and line-wise opto-electronic scanning of a pattern master. A brightness signal is acquired or generated from the measured color values in a progression signal generator for the shading of the colors or, in case the progression signal generator is a standard color computer for multicolor mixed printing, color separation signals are generated. Either the brightness signal or a color separation signal selected before the recording is employed as a recording signal for a color separation. A color recognition circuit having the measured color signals is pre-set for recognition of the individual master colors in the pattern master. The color recognition circuit supplies corresponding color recognition signals when the preset master colors are recognized during the scanning of the pattern master. The selected recording signal of the corresponding master color is always connected through to a write lamp of the recording element during the recording of the color separation of a selected master color as a function of the color recognition signal of the master color. This recording signal is connected through whenever the selected master color is recognized in the pattern master.

The write lamp—modulated in brightness by the recording signal—exposes a recording medium, for example a film, point-wise and line-wise. This recording medium represents the desired color separation after it is developed.

Given this method, the individual color tone distributions appear sharply delineated in the corresponding color separations so that the individual colors are printed exactly next to one another in the subsequent printing. This can be advantageous depending on the type of pattern masters, but can also occasionally lead to disturbing interruptions of the color transitions.

SUMMARY OF THE INVENTION

It is an object of the invention to provide a method and an apparatus for the production of color separations in single-color printing with which, in particular, the reproduction of color transitions is improved.

BRIEF DESCRIPTION OF THE DRAWINGS

The FIGURE shows a diagram of an apparatus for producing color separations for single-color printing, for example for textile, decorative, porcelain, or packaging printing.

DESCRIPTION OF THE PREFERRED EMBODIMENTS

A pattern master 2 is mounted on a rotating scanning drum 1, said pattern master 2 being scanned point-wise and line-wise by a scanning element 3. The scanning light coming from the pattern master 2 proceeds through lenses 4 and 5 and a diaphragm 6 into the scanning element 3 and is split there into three sub-beams by means of semireflecting mirrors 7 and 8.

The sub-beams are incident through color filters 9, 10, and 11 on three opto-electronic transducers 12, 13, and 14 which convert the received scanning light into three primary measured color signals B, G, and R as a measure for the color components blue, green, and red of the scanned image points.

The measured color signals R, G, and B are, under given conditions, logarithmized in a logarithmization stage 15 well known in the art or are partially logarithmized and supplied to a transformation stage 16 in, for example, the form of a color transformation stage, and are transformed there into the color signals $E_1$, $E_2$, and $E_3$ which represent the color space coordinates of the scanned colors.

A color recognition circuit 17 is provided for the discrimination of the color or color tones occurring in the pattern master 2, said color or color tones being referred to as master colors below. Color recognition spaces are delineated in the circuit 17 before the scanning of the pattern master 2 in the color space for the individual master colors to be distinguished. The individual color recognition spaces must be matched as well as possible to the color regions or areas of the master colors to be separated in order to achieve an exact color division. During scanning of the pattern master 2, the color recognition circuit 17 checks which delineated color recognition spaces the color signals $E_1$, $E_2$, and $E_3$ are to be allocated to and outputs corresponding color recognition signals A for the individual master colors. Let, for example, the color recognition circuit 17 be designed for the discrimination of sixteen master colors. It then generates 16 color recognition signals $A_1$ through $A_{16}$ of which respectively only one appears at a time. For example, the color recognition signal $A_1$ appears upon recognition of the master color "white", the color recognition signal $A_3$ appears upon recognition of the master color "reddish yellow", and the color recognition signal $A_5$ appears upon recognition of the master color "yellowish green".

The color recognition circuit 17 can be constructed in accordance with U.S. Pat. No. 4,110,826 or U.S. Pat. No. 4,194,839, incorporated herein by reference. In this case, the color recognition spaces are delineated by electronically generated threshold signals for the color signals $E_1$, $E_2$, and $E_3$. Alternatively the color recognition circuit 17 can be designed according to German Patent Nos. 29 23 468, 29 23 472, or 29 23 477, all incorporated herein by reference. In this case, the color recognition spaces are built up by means of inputting color numbers into a color recognition memory which is addressed during the color recognition by the color signals $E_1$, $E_2$, and $E_3$, whereby the color identification occurs by means of outputting the corresponding color numbers.

The measured color signals R, G, and B coming from the logarithmization stage 15 are simultaneously supplied to a correction circuit 18 for color and/or tonal corrections, wherein the measured color signals R, G, and B are transformed according to the regularities of subtractive color mixing into the color separation signals "yellow" (Y), "magenta" (M), "cyan" (C) and "black" (K), are modified and, under given conditions, are also mixed. The correction circuit 18, which is well known in the art, can, for example, be a color computer well known in the art for multi-color mixing printing, well known in the art.

The color separation signals Y, M, C, and K coming from the correction circuit 18 are—as a function of control signals $S_1$ through $S_4$ from control stage 21— connected through in a multiple switching stage 19 for recording and are first supplied to a resistive linking or logic stage 20 in which the connected through color separation signals Y, M, C, and K can, under given conditions, also be differently weighted, for example by different resistance choices.

In the sample embodiment, the individual switches 19a through 19d of the multiple switching stage 19 are symbolized by means of mechanical switches that are actuatable by the control signals $S_1$ through $S_4$. The multiple switching stage 19 is preferably an analog multiplexer. The multiple switching stage 19, however, may also comprise multipliers in which control signals and color separation signals are multiplicatively linked.

Each control signal $S_1$, $S_2$, $S_3$, or $S_4$ can be generated in an allocation stage 21 from at least one of the color recognition signals $A_1$ through $A_{16}$, which are freely selectable. The allocation stage 21 is connected to the multiple switching stage 19 and the color recognition circuit 17, so that the color separation signals Y or M, C, and K are always connected through as recording signal U whenever the allocated master colors have been identified in the scanning of the pattern master. This is in contrast to the traditional technology since at least two color separation signals or at least two master colors participate in the recording of a color separation. The respective connected through color separation signals Y or M, C, and K proceed over the linkage or logic stage 20, a film linearization stage 22 well known in the art, and a final amplifier 23 to the write lamp 24 of a recording element 25. The write lamp 24—modulated in brightness by the recording signal U—exposes a recording medium 29, for example a film, point-wise and line-wise with the assistance of lenses 26 and 27 as well as a write diaphragm 28. This recording medium 29 is mounted on a recording drum 30 rotating synchronously with the scanning drum 1. The exposed and developed film is one of the desired color separations or is already the printing form for the single-color print. The invention is not restricted to the production of color separations or printing forms by means of film exposure; for example, printing form engraving devices can also be employed.

The reproduction device is explained below with reference to a preferred manner of proceeding. This is particularly explained with respect to possible allocations of color recognition signals A and color separation signals Y or M, C, and K, or control signals S in the allocation stage 21.

First, that master color (separation color) whose printing density is to be respectively recorded with the full value and one of the color separation signals Y or M, C, and K (main signal) (for example the one that best reproduces the graduated color distribution of the separation color), are selected and the color recognition signal A of the selected separation color is allocated to the control signal S for the corresponding main signal. In an advantageous manner, the corresponding main signal is additionally controlled by the master color "white" since the color recognition signal A for the master color "white" is also allocated to the control signal S of the main signal.

When, for example, the color separation for the separation color "reddish yellow" is to be recorded, the color recognition signal $A_3$ for the separation color "reddish yellow" and the color recognition signal $A_1$ for the master color "white" will be allocated to the control signal $S_4$ for the switch 19a since the color separation signal Y reproduces the graduated color distribution for "reddish yellow" best.

Those master colors (subsidiary colors) which are to appear with reduced print density in the color separation currently to be recorded are then selected and their color separation signals Y or M, C, and K are corrected in the correction circuit 18 for initial and final density, gradation, and basic and selective color correction such that they furnish an optimum result in the color separation to be recorded. In conclusion, the control signals of the corresponding color separation signals Y or M, C, and K are then allocated to color recognition signals A of the selected subsidiary colors. Thus, those subsidiary colors which will preferably participate in the recording of the color separation in addition to the separation color are identified.

For example, if color interruptions or contours are to be anticipated between the separation color "reddish yellow" and the master color "yellowish green", "yellowish green" is defined as a subsidiary color and the corresponding color recognition signal $A_5$ for "yellowish green" is allocated to the control signal $S_2$ for the switch 19c since the graduated color distribution for "yellowish green" is best reproduced by the color separation signal C.

When recording the color separation "reddish yellow", the color separation signal Y will be connected through by means of switch 19a upon occurrence of the separation color "reddish yellow" as well as the master color "white". Also, the color separation signal C will be connected through by means of the switch 19c upon occurrence of the subsidiary color "yellowish green" and will participate in the recording of the color separation "reddish yellow". As a result, the color transition at the color area boundaries is advantageously improved such that the boundaries of color areas are no longer recorded sharp but, rather, overlap in a color separation. A zone of mixed printing arises due to the overlap, the blended colors in the single-color printing no longer being printed next to one another but on top of one another, whereby disturbing color interruptions are avoided. In addition, a better color division is also achieved in the color separations due to the selective correction of the subsidiary colors.

In the described procedure, a different master color or a different color recognition signal A is allocated to each color separation signal Y or M, C, or K. Since, as mentioned above, only one color recognition signal A always appears at every point in time, the recording signal U in the described example is likewise always only formed by the currently connected through color separation signal Y or M, C, K. The allocations of color separation signals Y or M, C, K and color recognition signals, however, are not restricted to the described procedure. It can thus be advantageous on occasion—as explained for the master color "white"—to allocate the color recognition signals A of a plurality of master colors to one color separation signal Y or M, C, K or, on the other hand, to simultaneously allocate a plurality of color separation signals Y or M, C, K to the color recognition signal A of one master color. In the latter case, the recording signal U will not be formed by one of the color separation signals Y or M, C, K but by an addition, particularly by a weighted addition, of color separation signals Y or M, C, K. The linkage or logic stage 20 then functions as an adder for the weighted color separation signals Y or M, C, K. It would also be just as conceivable to form the recording signal U by means of mixing the color separation signals Y or M, C, K by means of a balance controller driven by the color recognition signals A. The multiple switching stage 19 then consists of multipliers to which the color separation signals Y or M, C, K and the color recognition signals A are supplied. In this case, the color recognition circuit 17 must generate analog color recognition signals A that have their respective maximum values at the pre-set center of gravity colors within the color recognition spaces and which become zero at the boundaries of the color recognition spaces. Such a color recognition circuit is disclosed, for example, in U.S. Pat. No. 4,194,839, incorporated herein by reference.

In the construction of the preferred embodiment of the invention, the linearization stage may be of the type well known in the art such as shown in U.S. Pat. No. 4,075,662. Similarly, the color correction circuit 18, also previously known in the art may be of the type shown in U.S. Pat. No. 4,285,009.

The output signals E1, E2, E3 of the transformation stage 16 are either the chrominance signal X and Y and the luminance signal Z or, on the other hand, the color tone signal T, color saturation signal S, and luminance signal L. The transformation by transformation stage 16 of the measured color value signals R, G, and B into X, Y, and Z is known in the prior art from U.S. Pat. No. 4,110,826 (FIG. 5), incorporated herein by reference, and the transformation into T, S, and L is known from PCT publication No. WO81/01065 or from the corresponding U.S. Pat. No. 4,500,972, incorporated herein by reference.

Switching stage 19 in the preferred embodiment is constructed as an analog multiplexer as previously mentioned. It can, for example, be of the type DG506 of the Siliconix Company or as an analog multiplier of the type AD 7520 of the Analog Devices Company. Selected signals A are combined to a control signal in the allocation stage 21. The combination can be carried out in the preferred embodiment with normal mechanical switches that are disposed in a switching matrix network in well known fashion.

Although various minor changes and modifications might be proposed by those skilled in the art, it will be understood that we wish to include within the claims of the patent warranted hereon all such changes and modifications as reasonably come within our contribution to the art.

We claim as our invention:

1. A method for producing color separations for single-color printing, comprising the steps of:
    (a) trichromatically scanning a master having a plurality of colors point-by-point and line-by-line by means of an optoelectronic scanning element to obtain color signals;
    (b) producing color recognition signals from said color signals, said color recognition signals identifying the colors of said master during the scanning of said master;
    (c) generating corrected color separation signals from said color signals;
    (d) the corrected color separation signals each being controlled by at least one selected color recognition signal representing a selected color of said master;
    (e) forming a recording signal from at least two controlled corrected color separation signals; and
    (f) recording the color separations of the colors of said master point-by-point and line-by-line by use of a recording element controlled by said recording signal, each color separation thereby being recorded as a function of said at least two corrected color separation signals each controlled by said at least one selected color recognition signal representing a selected color of said master to obtain overlapping color areas in said color separation.

2. A method according to claim 1 including the step of controlling a color separation signal with a selected color recognition signal by switching on said color separation signal in the presence of said selected color recognition signal and switching it off in the absence of said selected color recognition signal.

3. A method according to claim 1 including the steps of:
    (a) selecting a color recognition signal representing a selected color of the master which is to be recorded with a full density value in a color separation corresponding to the selected color; and
    (b) controlling a color separation signal which best reproduces a graduated color distribution of the selected color with the selected color recognition signal.

4. A method according to claim 3 including the step of additionally controlling said color separation signal which best reproduces the graduated color distribution by the color recognition signal representing a color "white" of said master.

5. A method according to claim 1 including the additional steps of:
    (a) selecting color recognition signals for those additional colors of the master known as subsidiary colors which are to be recorded with less than full density values in a color separation;
    (b) further correcting the color separation signals of said additional colors; and
    (c) controlling the corrected color separation signals of said additional colors by said selected color recognition signals for the additional colors.

6. A method according to claim 1 including the steps of:

(a) controlling simultaneously at least two color separation signals by a same selected color recognition signal; and (b) forming said recording signal by adding said at least two color separation signals.

7. A method according to claim 6 wherein the recording signal is formed by weighted adding said at least two color separation signals.

8. An apparatus for producing color separations for single-color printing, comprising:

(a) an optoelectronic scanning means for scanning a master having a plurality of colors and for generating color signals;

(b) a color recognition means connected to the scanning means for producing color recognition signals from said color signals, said color recognition signals identifying the colors of said master during the scanning of said master;

(c) a correction means connected to the scanning means for generating corrected color separation signals from said color signals;

(d) circuit means connected to the correction means and to the color recognition means wherein corrected color separation signals are each controlled by at least one selected color recognition signal representing a selected color of said master and for forming a recording signal from at least two controlled corrected color separation signals; and (e) a recording means connected to the circuit means and controlled by said recording signal for point-by-point and line-by-line recording of color separations for colors of said master.

9. An apparatus according to claim 8 wherein said circuit means comprises:

(a) allocation means in signal paths of the color recognition signals output from the color recognition means for selecting color recognition signals used for controlling said corrected color separation signals; and (b) control means in signal paths of the color separation signals output from the correction means for controlling the color separation signals by said selected color recognition signals.

10. An apparatus according to claim 9 wherein the control means comprise switches.

11. An apparatus according to claim 9 wherein the control means comprise multipliers.

12. An apparatus according to claim 9 wherein the circuit means has a linking means which follows the control means for combining the controlled color separation signals to form the recording signal.

13. An apparatus according to claim 12 wherein the linking means is designed as an adder means for a weighted addition of the controlled color separation signals to form the recording signal.

* * * * *